(No Model.) 3 Sheets—Sheet 1.
E. NORTON & J. G. HODGSON.
CAN CAP SOLDERING MACHINE.
No. 379,976. Patented Mar. 27, 1888.
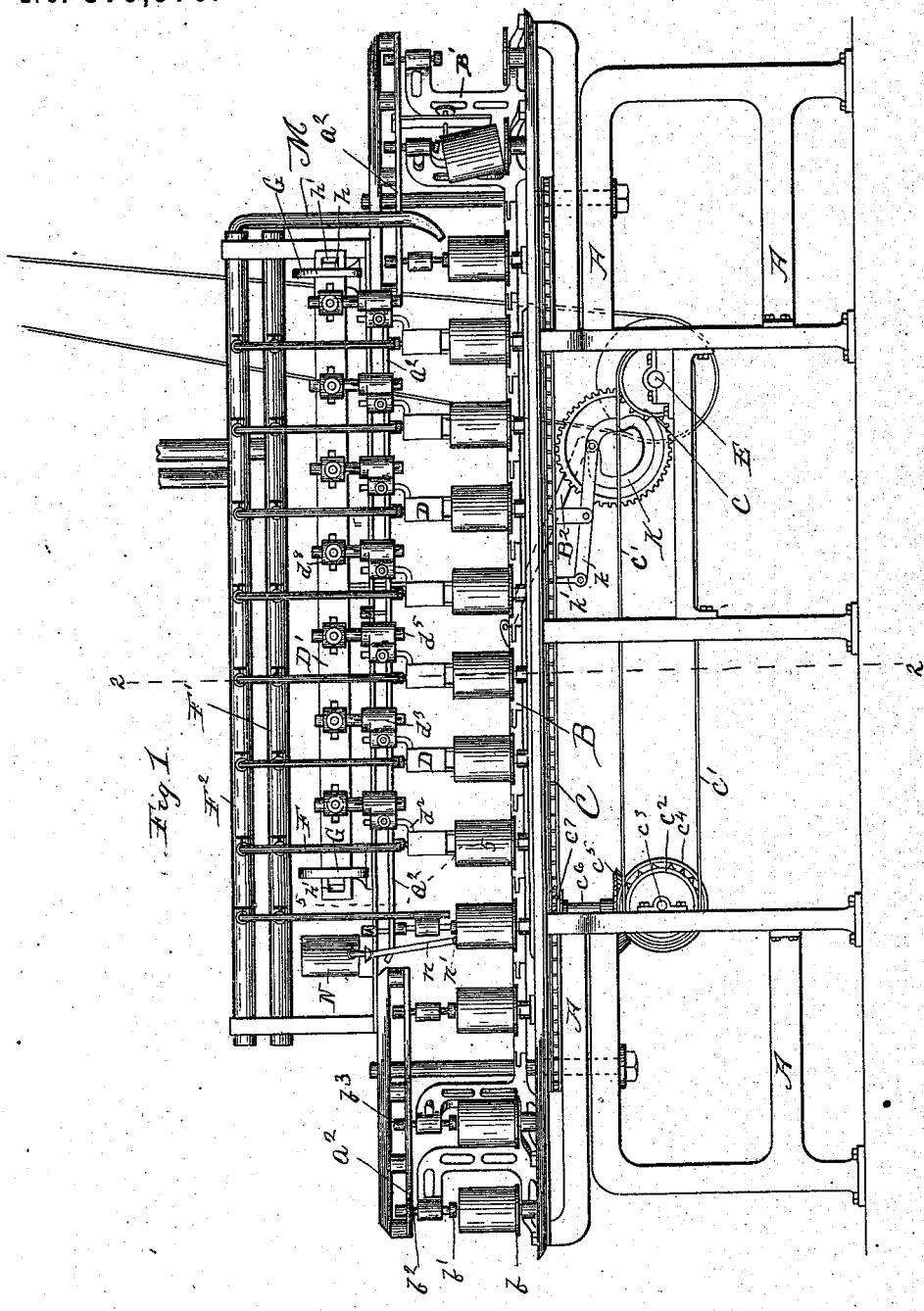
Witnesses:
Lew. C. Curtis.
H. W. Munday.
Inventors:
Edwin Norton
John G. Hodgson.
By Munday, Evarts & Adcock.
their Attorneys.

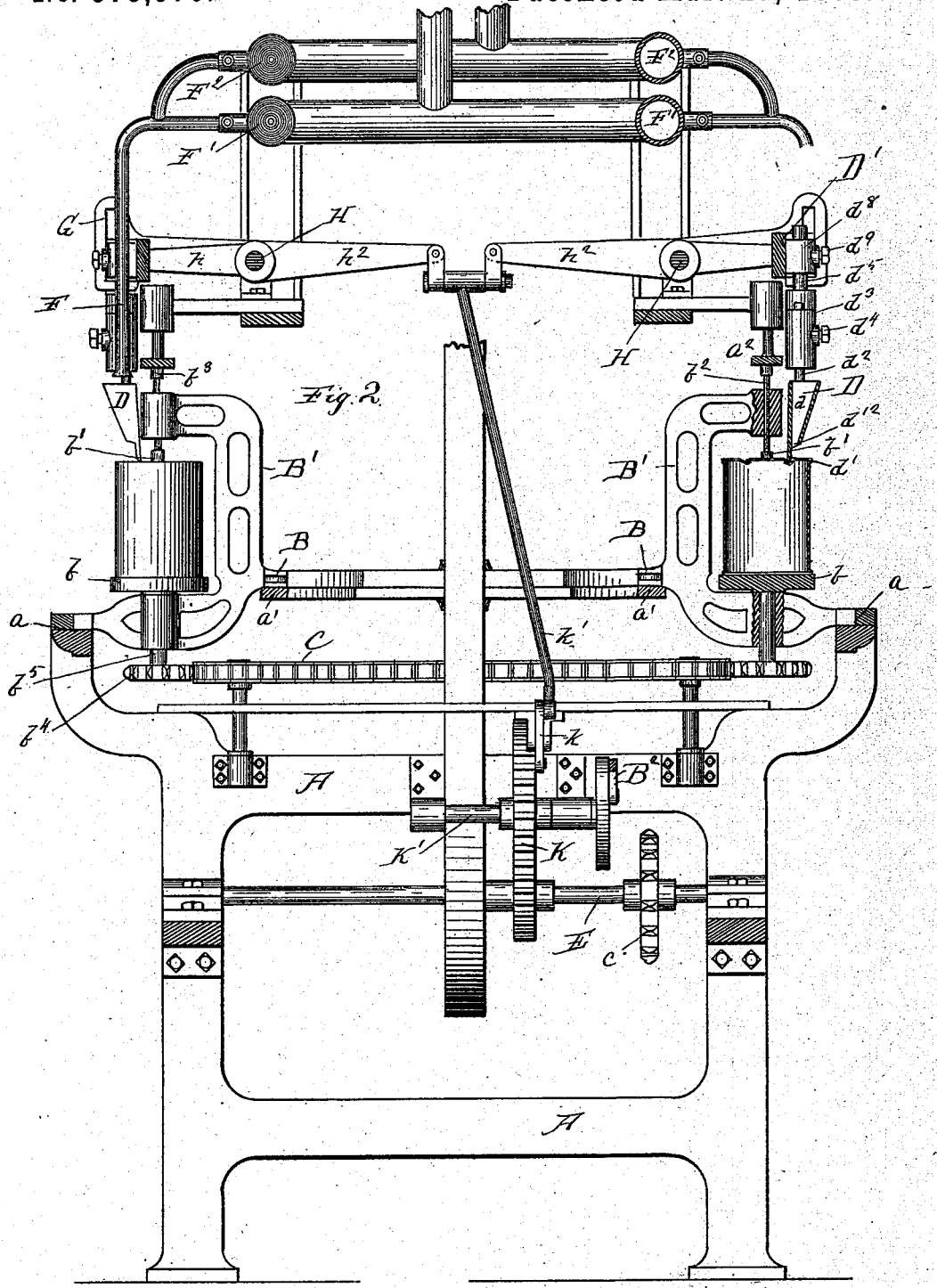

(No Model.) 3 Sheets—Sheet 3.
E. NORTON & J. G. HODGSON.
CAN CAP SOLDERING MACHINE.
No. 379,976. Patented Mar. 27, 1888.
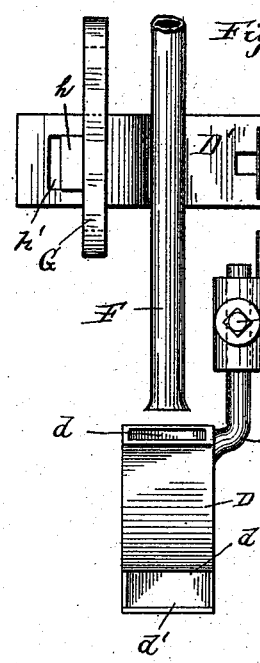
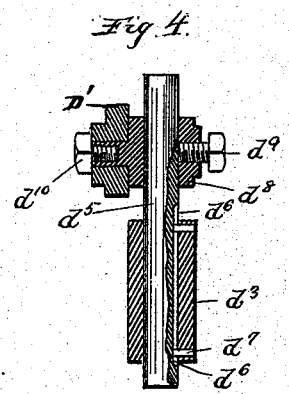
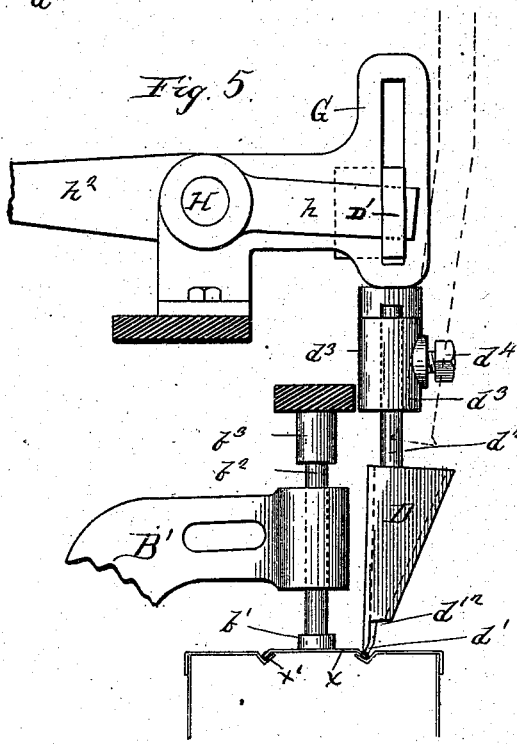
Witnesses:
Inventors:
Edwin Norton
John G. Hodgson
By Munday, Evarts & Adcock
their Attorneys

UNITED STATES PATENT OFFICE.

EDWIN NORTON AND JOHN G. HODGSON, OF MAYWOOD, ASSIGNORS TO SAID NORTON, AND OLIVER W. NORTON, OF CHICAGO, ILLINOIS.

CAN-CAP-SOLDERING MACHINE.

SPECIFICATION forming part of Letters Patent No. 379,976, dated March 27, 1888.

Application filed December 27, 1887. Serial No. 258,939. (No model.)

*To all whom it may concern:*

Be it known that we, EDWIN NORTON and JOHN G. HODGSON, citizens of the United States, residing in Maywood, in the county of Cook and State of Illinois, have invented a new and useful Improvement in Can-Cap-Soldering Machines, of which the following is a specification.

Our invention relates to soldering-machines for soldering on the caps or final heads of filled cans, and more particularly to improvements upon the machine heretofore patented to us in Letters Patent No. 340,148, of April 20, 1886.

The object of our present invention is to provide an automatic can-cap-soldering machine for soldering cans with solder-hemmed caps, such as are shown and described in Patent No. 364,362, granted to Edwin Norton, June 14, 1887.

Our present improvement consists in an intermittently-moving can-carrier having a series of can-holders at regular intervals for holding the cans with their solder-hemmed caps thereon, and a series of movable heater-irons secured to a common bar or cross-head which is automatically lifted or vibrated to intermittently move the heater-irons into and out of contact with the cans as they are successively advanced by the intermittently-moving carrier, and thus gradually melt the solder strip or annulus and heat the seam by the successive contacts with the several heater-irons. It also consists in the novel devices and novel combinations of devices herein shown and described, and more particularly pointed out in the claims.

In the accompanying drawings, which form a part of this specification, and in which similar letters of reference indicate like parts, Figure 1 is a side elevation of a machine embodying our invention. Fig. 2 is a cross-section on line 2 2 of Fig. 1. Fig. 3 is an enlarged detail side elevation of one of the heater-irons. Fig. 4 is a vertical cross-section on line 4 4 of Fig. 3, and Fig. 5 is an enlarged partial cross-section on line 5 5 of Fig. 1.

In said drawings, A represents the frame of the machine; B, the can-carrier chain; B', the can-holder frames or brackets thereon; $b\,b'$, the revolving disks or clamps which hold the can; $a\,a'$, the tracks on the frame of the machine upon which the carrier-chain travels; $a^2$, the cam or guide way on the frame of the machine, which serves to press or hold the upper revolving disk or clamp, $b'$, down upon the can and to lift it free from the can at the ends of the machine where the cans are placed in and taken out. The middle portion of the cam $a^2$ presses against the end of the spindle $b^2$ of the clamp $b'$, and the end portion of the cam engages a shoulder or button, $b^3$, on said spindle. The can-holder is revolved by a gear, $b^4$, on the spindle $b^5$ of the lower can-holder disk, which gear meshes with the links of an endless chain gear, C. In case other than a chain carrier be employed, the gear C would of course, preferably, be an ordinary cast gear or rack. The chain gear C is continuously driven through sprocket-wheels $c$ on the driving-shaft E, chain $c'$, wheel $c^2$ on the shaft $c^3$, and bevel-gears $c^4\,c^5$, the latter on the vertical shaft $c^6$, which is furnished with a driving-gear, $c^7$, meshing with the chain C. The endless flexible can-carrier B is given an intermittent motion through any suitable mechanism—as, for example, a pitman-rod, B², operating a slide-carrying pawl which engages the chain B. All these parts of the machine are fully shown and described in the prior patent before referred to, and therefore need no detailed description here. Our present improvement is also equally applicable to other can-carriers of other constructions. We have, however, shown in the drawings the construction we prefer to use, the same being, as we believe, the best way now known to us for practicing our invention.

D D represent a series of heater-irons attached equidistant apart to a common movable bar or frame-piece, D'. The distance between the heaters D D is the same as the distance between the can-holders on the intermittently-moving can-carrier B, so that while one can is being heated or partially heated by one heater the next can will receive heat from the next heater, &c. The bar D', as shown in the drawings, is furnished with seven heater-irons, and we prefer to employ a series of heaters of about this number, so that the seam or joint to be soldered may be gradually heated, each in part by each of the heater-irons in turn as the carrier advances. By this means perfect soldering of every can is insured, and the capacity of the machine is not diminished, as seven or a series of different cans are being in part heated and soldered simultaneously, while a single attendant may place the cans in the machine for the whole series of heater-irons.

The heater-irons are made hollow, or with cavities $d$, into which flames are projected or directed by a corresponding series of gas burners or jets, F F, arranged on the frame of the machine equidistant apart, like the heater-irons. The heater-irons each have a curved lower end, $d'$, corresponding to the rim of the can-cap $x$ or to the seam to be soldered. The heater-iron, being hollow, is thus not only heated by the flame, but it serves to direct the flame down through the same upon the seam to be soldered and upon the solder strip or annulus $x'$, folded over the edge of the can-cap. The heaters are all adjustably secured to their common operating-bar D', so that they may be adjusted up and down to accommodate cans of different lengths and adjusted laterally and longitudinally in respect to the bar D' to accommodate cans or can-caps of different diameters and to bring the heater-iron in proper position in relation to the seam. The heater D has a bent or offset shank or arm, $d^2$, which fits and is secured in a socket-piece or sleeve, $d^3$, by a set-screw, $d^4$. The sleeve $d^3$ is mounted to slide freely on a vertical bar, $d^5$, having a slot, $d^6$, the sliding sleeve $d^3$ being furnished with guide-pins $d^7$, which enter said slot, and thus prevent the sleeve $d^3$ from turning on said bar or rod $d^5$, and also thus limit the sliding movement of the sleeve $d^3$ on said bar or rod. The rod $d^5$ is adjustably secured in a sliding bracket, $d^8$, by a set-screw, $d^9$, so that the rod may be moved up and down therein or turned on its axis. The bracket or slide $d^8$ is adjustably secured to the operating-bar D' by a screw, $d^{10}$, which passes through a longitudinal slot, $d^{11}$, in the bar D'. By this means all necessary adjustments may be given to the heater-irons or soldering-tools D, each one being independently adjustable, while they have a common operating-bar, and each tool always presses with a uniform force—that of its own weight—against the seam to be soldered, notwithstanding any variation in the exact height of the different cans in respect to each other.

The bar D' is mounted to reciprocate vertically in suitable guides, G G, secured to the frame of the machine. It is operated by a rock-shaft, H, having arms $h$ $h$, connected to or passing through holes $h'$ $h'$ in said bar D' near its ends. The rock-shaft is intermittently operated to raise and lower the heater-irons by means of a cam, K, on the shaft K', lever $k$, and connecting-rod $k'$, which is connected with an arm, $h^2$, on the rock-shaft H. Other equivalent means may be employed for reciprocating the heater-operating bar D'.

The burners or gas-jets F are all connected to the gas-supply pipe F' and air-supply pipe F².

N represents an acid or flux supply tank, and $n$ the tube, and $n'$ the brush for applying the acid. These parts are fully shown and described in the Patent No. 340,148, before referred to. Other aciding or fluxing devices may be employed, or they may be entirely omitted if the flux is embraced within the solder annulus folded over the rim of the can-cap, as is described in said Patent No. 364,362. As in said Patent No. 340,148, the machine shown herein is double, each side being the duplicate of the other.

M is a pipe for jetting a blast of air upon the can for cooling the soldered seam.

The heater-irons or soldering-tools may be made of iron, steel, copper, or other suitable metal. By calling these tools "heater-irons" we do not mean that they are necessarily composed of the metal iron.

The hollow heater-iron D is provided with an open lower end, $d^{12}$, to permit the flame to spread at the surface of the can, and also to admit the air to the flame while the tool is resting upon the can. This not only aids the combustion and the projection of the flame upon the seam, but also by admission of the air prevents injury to the can or seam by too great concentration of heat thereon.

The pins $d^7$ on the sliding sleeve or arm $d^3$ are somewhat smaller in diameter than the width of the slot $d^6$, in which they fit, so that this sliding arm $d^3$ may, in addition to its up-and-down sliding movement, have a slight rocking or radial movement on the bar $d^5$. This is for the purpose of permitting the heater and soldering tool D to accommodate itself to the can-cap seat or seam-groove of the can as the can revolves in cases where the can may not be chucked exactly centrally in its revolving can-holder. In practice the cans will be generally so placed in the revolving can-holder that the axis of the can will approximately coincide with the axis of the revolving can-holder; but it will frequently happen that the can is placed more or less eccentrically in its revolving holder, and sometimes, too, the can-cap seat or seam-groove in the head of the can, in and upon which the tool D rides, and which it tends to follow, is more or less eccentric or irregular. To compensate for such eccentricity or irregularity and to permit the tool D to readily and smoothly follow the can-cap seat or seam-groove without strain, and thus to do perfect work, this slight radial or rocking movement of the tool is of value in the practical operation of the machine. The pivot upon which the tool D has this horizontal rocking motion may of course be provided at any part of the connection between the tool and its operating-bar D' or its support; so, also, in regard to its vertically-sliding movement.

We claim—

1. In a soldering-machine, the combination, with a can-carrier having a series of can-holders, of a series of movable heater-irons and mechanism for simultaneously moving said heater-irons into and out of contact with the cans on said holder, substantially as specified.

2. The combination, with an intermittently-moving can-carrier furnished with a series of revolving can-holders, of a series of intermittently-movable heater and soldering tools, D, and a common operating-bar, D', to which said tools are secured, substantially as specified.

3. The combination, with a can-carrier furnished with a series of can-holders, of a series of heater and soldering tools, D, and a series of gas burners or jets, F, for heating said tools, substantially as specified.

4. The combination, with a can-carrier having a series of can-holders, of a series of hollow heaters and soldering-tools, D, and a series of burners, F, for projecting flame into said tools, substantially as specified.

5. The combination, with a can-carrier having a series of can-holders, of a heater-operating bar, D', and a series of heater-tools, D, mounted upon and carried by said bar, said heater-tools having a free sliding connection with said operating-bar, so that the heater-tools will press against the cans by their own gravity, substantially as specified.

6. The combination, with an intermittently-moving can-carrier having a series of revolving can-holders, of a series of hollow heater and soldering tools, D, and common operating-bar, D', with which said tools have a limited sliding connection, and means for reciprocating said bar to move the tools into and out of contact with the cans, substantially as specified.

7. The combination, with an intermittently-moving can-carrier having a series of revolving can-holders, of a series of hollow heater and soldering tools, D, and common operating-bar, D', with which said tools have a limited sliding connection, and means for reciprocating said bar to move the tools into and out of contact with the cans, and gas burners or jets F, for heating said tools, substantially as specified.

8. The combination, with an intermittently-moving can-carrier having a series of revolving can-holders, of a series of hollow heater and soldering tools, D, and common operating-bar, D', with which said tools have a limited sliding connection, and means for reciprocating said bar to move the tools into and out of contact with the cans, and gas burners or jets F, for heating said tools, said tools D being hollow and said burners F projecting the flame into said tools, substantially as specified.

9. The combination, with a can-carrier having a series of can-holders, of a heater-tool-operating bar, D', and a series of heater-tools, D, adjustably connected to said bar, substantially as specified.

10. The combination, with bar D', of a series of heater-tools, D, having a vertically and horizontally sliding connection with said bar, and a can-carrier furnished with a series of revolving can-holders, substantially as specified.

11. The combination, with a can-carrier having a series of revolving can-holders, of a heating and soldering tool, D, having a slight rocking or radial movement in its support to adapt said tool to ride in or follow the seam of the revolving can when said can may be placed somewhat eccentrically in its revolving holder, substantially as specified.

12. The combination, with a revolving can-holder, of a pivotally-mounted heater or soldering tool having a limited free rocking or radial movement on its pivot to adapt the tool to follow the seam of the revolving can, the pivot of said tool being about parallel to the axis of the revolving can-holder, substantially as specified.

13. The combination, with a revolving can-holder, of a vertically-sliding horizontally-rocking heater or soldering tool, D, whereby the tool is adapted to press with the uniform pressure of its own weight upon the can and to ride upon and follow the can-cap seat or seam-groove when the can is placed eccentrically in its revolving holder, substantially as specified.

14. The combination, with bar D', of a series of heater-tools, D, having shanks $d^2$, sliding sleeves $d^3$, arms $d^5$, and brackets $d^8$, secured to said bar D, substantially as specified.

15. The combination, with bar D', of a series of heater-tools, D, having shanks $d^2$, sliding sleeves $d^3$, arms $d^5$, and brackets $d^8$, secured to said bar D', said bar D' having longitudinal slots for adjustably attaching said brackets $d^8$ thereto, substantially as specified.

16. The combination, with a can-carrier having a series of can-holders, of a series of heater-tools, D, having shanks $d^2$, heater-bar D', sliding sleeve $d^3$, arms $d^5$, adjustable brackets $d^8$, rock-shaft H, having arms $h\ h$, and means for operating the same, substantially as specified.

EDWIN NORTON.
JOHN G. HODGSON.

Witnesses:
 H. M. MUNDAY,
 R. H. MUNDAY.